US009211795B2

(12) United States Patent
Kimoto et al.

(10) Patent No.: US 9,211,795 B2
(45) Date of Patent: Dec. 15, 2015

(54) ELECTRONIC CONTROL APPARATUS

(71) Applicant: DENSO CORPORATION, Kariya, Aichi-pref. (JP)

(72) Inventors: Yuu Kimoto, Chita-gun (JP); Takahiro Ogawa, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/187,407

(22) Filed: Feb. 24, 2014

(65) Prior Publication Data
US 2014/0257610 A1 Sep. 11, 2014

(30) Foreign Application Priority Data

Mar. 6, 2013 (JP) .................. 2013-044503

(51) Int. Cl.
*B60L 7/16* (2006.01)
*B60L 7/18* (2006.01)
*B60L 11/18* (2006.01)
*B60L 15/20* (2006.01)

(52) U.S. Cl.
CPC ... *B60L 7/16* (2013.01); *B60L 7/18* (2013.01); *B60L 11/187* (2013.01); *B60L 15/2081* (2013.01); *B60L 11/1861* (2013.01); *B60L 2240/36* (2013.01); *B60L 2240/425* (2013.01); *B60L 2240/445* (2013.01); *B60L 2240/525* (2013.01); *B60L 2240/545* (2013.01); *Y02T 10/642* (2013.01); *Y02T 10/7005* (2013.01); *Y02T 10/705* (2013.01); *Y02T 10/7044* (2013.01); *Y02T 10/7275* (2013.01)

(58) Field of Classification Search
None
See application file for complete search history.

(56) References Cited

U.S. PATENT DOCUMENTS

| | | | | | |
|---|---|---|---|---|---|
| 5,973,460 | A | * | 10/1999 | Taga et al. | 318/139 |
| 2003/0132664 | A1 | * | 7/2003 | Grand et al. | 303/20 |
| 2004/0000281 | A1 | * | 1/2004 | Wakitani et al. | 123/179.3 |
| 2005/0143877 | A1 | * | 6/2005 | Cikanek et al. | 701/22 |
| 2006/0220608 | A1 | * | 10/2006 | Izumi et al. | 318/801 |

(Continued)

FOREIGN PATENT DOCUMENTS

| | | |
|---|---|---|
| JP | 2004-096936 A | 3/2004 |
| JP | 2006-136081 A | 5/2006 |

(Continued)

OTHER PUBLICATIONS

Office Action mailed Feb. 10, 2015 issued in corresponding JP patent application No. 2013-044503 (and English translation).

*Primary Examiner* — Yonel Beaulieu
*Assistant Examiner* — Krishnan Ramesh
(74) *Attorney, Agent, or Firm* — Posz Law Group, PLC

(57) ABSTRACT

In an electronic control apparatus mountable on a vehicle including a motor generator and a battery rechargeable by regenerative action of the motor generator, a charge determinator determines whether the battery is unable to be charged, a rollback determinator determines whether a rollback of the vehicle occurs, an accelerator determinator determines whether an accelerator pedal of the vehicle is depressed based on an amount of depression of the accelerator pedal, a motor lock device locks the motor generator when the battery is unable to be charged, the rollback of the vehicle occurs, and the accelerator pedal is depressed, and a torque commander, when the lock of the motor generator is completed, commands the motor generator to generate a drive torque according to the amount of depression of the accelerator pedal while releasing the lock of the motor generator.

11 Claims, 13 Drawing Sheets

(56) References Cited

U.S. PATENT DOCUMENTS

| | | | | |
|---|---|---|---|---|
| 2009/0230908 A1* | 9/2009 | Soma et al. | | 318/452 |
| 2009/0299557 A1* | 12/2009 | Farnsworth | | 701/22 |
| 2011/0175473 A1* | 7/2011 | Kitabatake et al. | | 310/77 |
| 2013/0178332 A1* | 7/2013 | Kazama et al. | | 477/21 |
| 2013/0207582 A1* | 8/2013 | Chi | | 318/400.21 |
| 2014/0257618 A1* | 9/2014 | Hiasa et al. | | 701/22 |

FOREIGN PATENT DOCUMENTS

| | | |
|---|---|---|
| JP | 2006-262645 A | 9/2006 |
| JP | 2007-329982 A | 12/2007 |
| JP | 2008-154307 A | 7/2008 |
| JP | 2008-193772 A | 8/2008 |
| JP | 2009-232485 A | 10/2009 |
| JP | 2011-126379 A | 6/2011 |

* cited by examiner

ELECTRONIC CONTROL APPARATUS

CROSS REFERENCE TO RELATED APPLICATION

This application is based on Japanese Patent Application No. 2013-44503 filed on Mar. 6, 2013, the contents of which are incorporated herein by reference.

FIELD

The present disclosure relates to an electronic control apparatus mountable on a vehicle driven by a motor generator connected to a drive wheel of the vehicle.

BACKGROUND

A motor-driven vehicle, such as a hybrid electric vehicle (HEV), an electric vehicle (EV), or a fuel cell vehicle (FCV), driven by a motor generator (MG) connected to a drive wheel of the vehicle has been known. When such a motor-driven vehicle starts forward or backward on an inclined road such as a hill, the vehicle may roll back in a direction opposite to a direction in which the vehicle starts due to a gradient of the road. When the vehicle which rolls back tries to start, the MG performs regenerative action and generates electric power to charge a battery mounted on the vehicle.

If the battery is fully or nearly fully charged, the battery is at very low temperatures, or the battery suffers from failures which make the battery unable to be changed, a charge to the battery is limited or prevented. In this way, if the battery is unable to be charged, the MG is limited to generate electric power and cannot perform the regenerative action. Therefore, the vehicle which rolls back is difficult to start.

JP-A-2008-193772 discloses a technique for allowing a vehicle which rolls back to start by consuming electric power stored in a battery. JP-A-2008-193772 relates to a control apparatus for an electric vehicle having a MG connected to a wheel of the vehicle to drive the wheel and a battery rechargeable by regenerative power of the MG. The control apparatus includes a rollback detector for detecting a rollback of the vehicle and a consumption controller for causing electric power stored in the battery or regenerative power of the MG to be consumed by an electrical load (e.g., compressor).

SUMMARY

A disadvantage of the control apparatus is that an additional electrical load such a compressor to consume the power stored in the battery is necessary. Further, in the control apparatus, the amount of drive torque to be generated depends on the amount of electric power consumed by the electrical load.

In view of the above, it is an object of the present disclosure to provide an electronic control apparatus for allowing a vehicle which rolls back to suitably start without using an additional electrical load even when a battery of the vehicle is unable to be charged.

According to an aspect of the present disclosure, an electronic control apparatus is mountable on a vehicle which includes a motor generator and a battery. The motor generator is connected to a drive wheel of the vehicle to drive the drive wheel. The battery supplies electric power to the motor generator and is able to be charged by regenerative action of the motor generator. The electronic control apparatus includes a charge determinator, a rollback determinator, an accelerator determinator, a motor lock device, and a torque commander. The charge determinator determines whether the battery is unable to be charged. The rollback determinator determines whether a rollback of the vehicle occurs. The accelerator determinator determines whether an accelerator pedal of the vehicle is depressed based on an amount of depression of the accelerator pedal. The motor lock device locks the motor generator when all the following three conditions are satisfied: the battery is unable to be charged, the rollback of the vehicle occurs, and the accelerator pedal is depressed. When the lock of the motor generator is completed, the torque commander commands the motor generator to generate a drive torque according to the amount of depression of the accelerator pedal while releasing the lock of the motor generator.

As described above, according to the aspect of the present disclosure, the motor generator is locked, when the battery is unable to be charged, the rollback of the vehicle occurs, and the accelerator pedal is depressed. Thus, the vehicle which rolls back can be temporarily stopped. Then, when the lock of the motor generator is completed, the drive torque is generated according to the amount of depression of the accelerator pedal while the lock of the motor generator is released.

In such an approach, even when the battery is unable to be charged, and the motor generator is unable to perform regenerative action, it is possible to temporarily stop the vehicle which rolls back and then start the temporarily stopped vehicle. Therefore, there is no need to charge the battery. That is, according to the aspect of the present disclosure, since electric power to charge the battery is not generated, an additional electrical load such as a compressor is unnecessary. Thus, even when the battery is unable to be charged, it is possible to suitably start the vehicle which rolls back without using an additional electrical load.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure are described below with reference to the drawings.

First Embodiment

An electronic control apparatus 100 according to a first embodiment of the present disclosure is described with reference to FIGS. 1-4. According to the first embodiment, the electronic control apparatus 100 is applied to a vehicular apparatus shown in FIG. 1. The vehicular apparatus is mounted on a vehicle, such as a HEV, an EV, or a FCV, equipped with a motor generator (MG) and a battery (not shown). The MG is connected to a drive wheel of the vehicle. The battery is capable of supplying electric power to the MG and also capable of being recharged by a regenerative action (i.e., energy recovery action) of the MG. As shown in FIG. 4, the MG can be a well-known synchronous motor.

Figure 1:
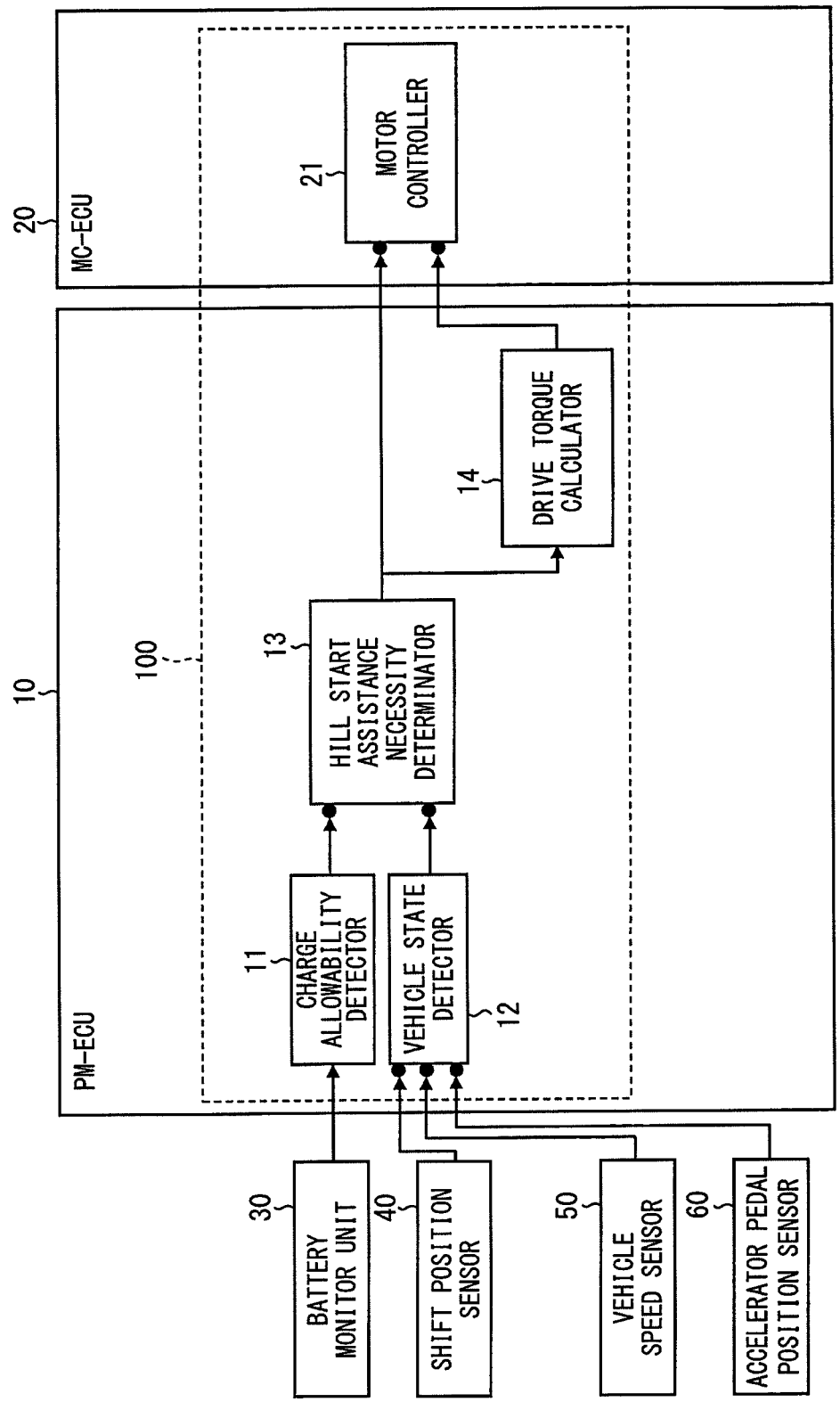
FIG. 1 is a block diagram of an electronic control apparatus according to a first embodiment of the present disclosure.

As shown in FIG. 1, the vehicular apparatus includes a power management electronic control unit (PM-ECU) 10, a motor control electronic control unit (MC-ECU) 20, a battery monitor unit 30, a transmission shift position sensor 40, a vehicle speed sensor 50, and an accelerator pedal position sensor 60.

The PM-ECU 10 performs control related to power supply to the MC-ECU 20. For example, the PM-ECU 10 is configured as a computer and has hardware components including a central processing unit (CPU), a read only memory (ROM), a random access memory (RAM), and an input/output (I/O) circuit. These hardware components are connected through buses. The PM-ECU 10 has functional blocks including a charge allowability detector 11, a vehicle state detector 12, a hill start assistance necessity determinator 13, and a drive torque calculator 14. The hill start assistance necessity determinator 13 is hereinafter simply referred to as the "determinator 13".

The PM-ECU 10 is electrically connected to the battery monitor unit 30, the shift position sensor 40, the vehicle speed sensor 50, the accelerator pedal position sensor 60, and the MC-ECU 20. The PM-ECU 10 receives information outputted from the battery monitor unit 30, the shift position sensor 40, the vehicle speed sensor 50, and the accelerator pedal position sensor 60. The functional blocks 11-14 of the PM-ECU 10 perform predetermined processes based on the inputted information, so that the PM-ECU 10 outputs a drive torque command and a motor lock command to the MC-ECU 20.

The MC-ECU 20 drives an inverter based on the commands from the PM-ECU 10, thereby driving and controlling the MG. For example, the MC-ECU 20 is configured as a computer in the same manner as the PM-ECU 10. The MC-ECU 20 has a motor controller 21 as a functional block.

As indicated by a broken line in FIG. 1, the motor controller 21 of the MC-ECU 20 and the charge allowability detector 11, the vehicle state detector 12, the determinator 13, and the drive torque calculator 14 of the PM-ECU 10 are included in the electronic control apparatus 100. The processes performed by the functional blocks of the PM-ECU 10 and the MC-ECU 20 are described in detail later.

The battery monitor unit 30 monitors a state of the battery. According to the first embodiment, the battery monitor unit 30 outputs battery information indicative of whether or not the battery is able to be charged. For example, the battery information indicates that the battery is unable to be charged, when the battery is fully or nearly fully charged, the battery is at very low temperatures, or the battery suffers from failures which make the battery unable to be charged.

The shift position sensor 40 outputs shift information indicative of a transmission shift position of the vehicle. The vehicle speed sensor 50 outputs speed information indicative of a vehicle speed (i.e., running speed) of the vehicle. The accelerator pedal position sensor 60 outputs accelerator information indicative of the amount of depression of an accelerator pedal of the vehicle, i.e., an opening degree of an accelerator of the vehicle.

Next, operations of the PM-ECU 10 and the MC-ECU 20 are described with reference to FIGS. 2-4. The PM-ECU 10 repeatedly performs a control process shown in a flowchart of FIG. 2 at a predetermined time interval. Alternatively, when the PM-ECU 10 determines that the battery is able to be charged, the PM-ECU 10 can be triggered to perform procedures after S20 in the flowchart.

The control process starts at S10 where the charge allowability detector 11 determines whether the battery is unable to be charged based on the battery information received from the battery monitor unit 30. S10 corresponds to a procedure as functions of a charge determinator recited in claims. If the charge allowability detector 11 determines that the battery can be charged corresponding to NO at S10, the control process ends. In contrast, if the charge allowability detector 11 determines that the battery is unable to be charged corresponding to YES at S10, the control process proceeds to S20.

At S20, the determinator 13 determines whether a rollback of the vehicle occurs based on vehicle state information received from the vehicle state detector 12. S20 corresponds to a procedure as functions of a rollback determinator recited in claims. The vehicle state detector 12 detects a state of the vehicle based on the shift information received from the shift position sensor 40, the speed information received from the vehicle speed sensor 50, and the accelerator information received from the accelerator pedal position sensor 60. Specifically, the vehicle state detector 12 detects the shift position based on the shift information received from the shift position sensor 40, detects the vehicle speed based on the speed information received from the vehicle speed sensor 50, and detects the accelerator opening degree based on the accelerator information received from the accelerator pedal position sensor 60. The vehicle state detector 12 outputs the vehicle state information including the shift position, the vehicle speed, and the accelerator opening degree to the determinator 13.

The determinator 13 determines whether the rollback of the vehicle occurs based on the shift position and the vehicle speed included in the vehicle state information received from the vehicle state detector 12. When the shift position is in a drive (D) position and the vehicle speed is negative, the determinator 13 determines that the rollback of the vehicle occurs. In addition, when the shift position is in a reverse (R) position and the vehicle speed is positive, the determinator 13 also determines that the rollback of the vehicle occurs.

Assuming that a driver releases both an accelerator pedal and a brake pedal of a vehicle when the vehicle is on an uphill in such a manner that a rear side of the vehicle can be positioned vertically lower than a front side of the vehicle, the rollback of the vehicle may occur. FIG. 3 is a timing diagram observed when the vehicle rolls back on the hill. The release of the accelerator pedal means that the driver does not depress the accelerator pedal so that the accelerator opening degree can be zero or substantially zero. The release of the brake pedal means that the driver does not depress the brake pedal so that an opening degree of a brake can be zero or substantially zero.

Figure 3:
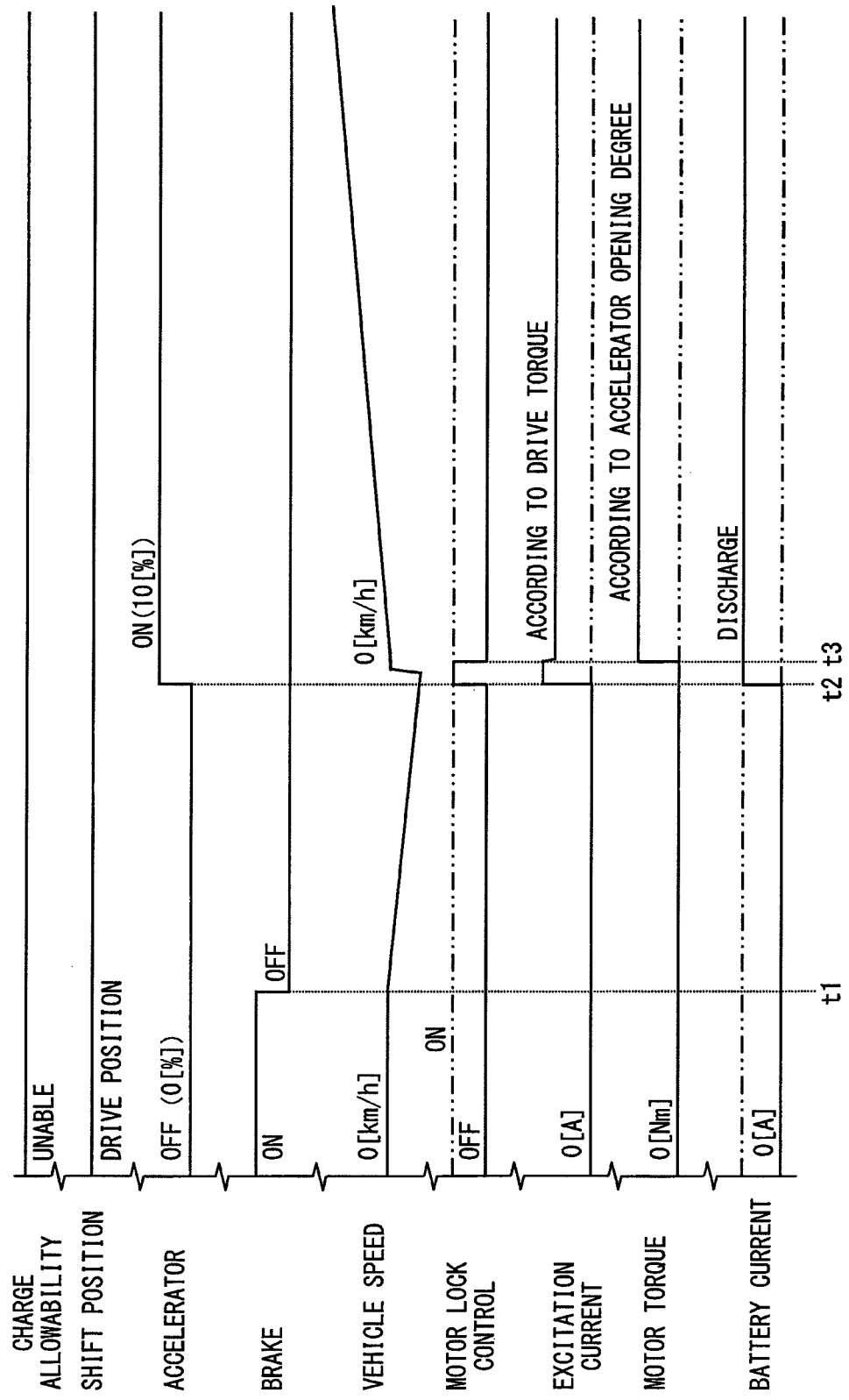
FIG. 3 is a timing diagram of the operation of the electronic control apparatus according to the first embodiment.
Figure 4:
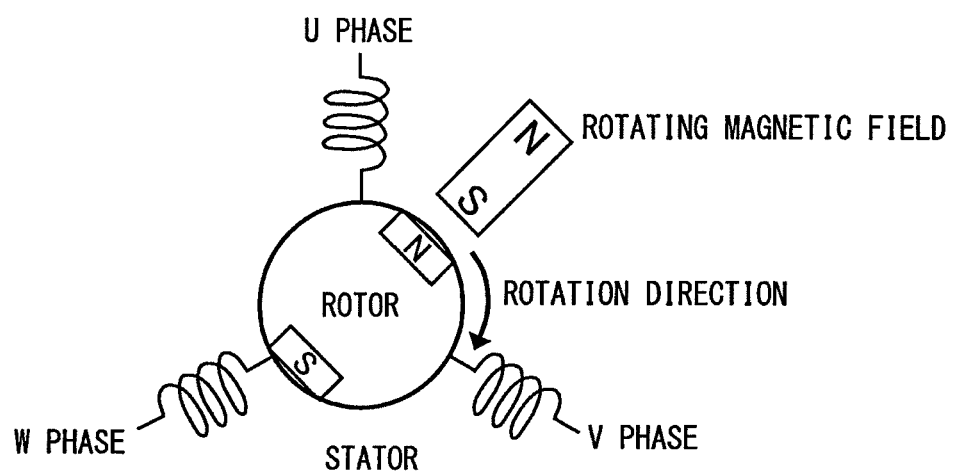
FIG. 4 is a diagram illustrating a motor generator according to the first embodiment.

In the timing diagram shown in FIG. 3, at a time t1, the battery is unable to be charged, the shift position is in the D position, and the vehicle speed is negative. Therefore, at the time t1, the determinator 13 determines that the rollback of the vehicle occurs. If the accelerator pedal and the brake pedal remain released after the rollback of the vehicle occurs, the vehicle may roll back down the hill during a time period from the time t1 to a time t2.

Figure 2:
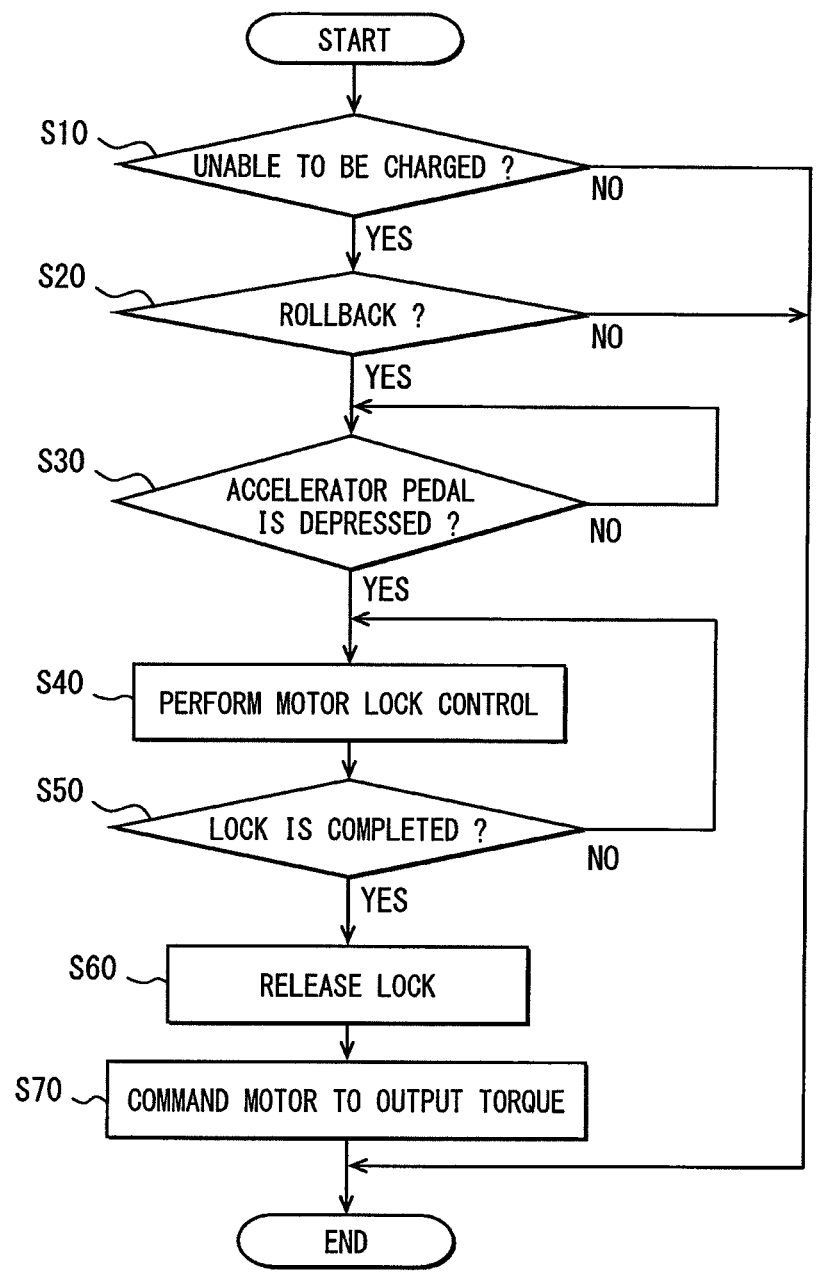
FIG. 2 is a flowchart of an operation of the electronic control apparatus according to the first embodiment.

Referring back to the flowchart of FIG. 2, at S30, the determinator 13 determines whether the accelerator pedal is depressed based on the accelerator opening degree included in the vehicle state information received from the vehicle state detector 12. In other words, the determinator 13 determines whether the accelerator pedal is depressed based on the amount of depression of the accelerator pedal included in the vehicle state information received from the vehicle state detector 12. S30 corresponds to a procedure as functions of an accelerator determinator recited in claims. If the determinator 13 determines that the accelerator pedal is depressed corresponding to YES at S30, the control process proceeds to S40.

At S40, the motor controller 21 performs motor lock control based on the motor lock command. That is, when all the following three conditions are satisfied, a motor lock start condition is satisfied so that the motor controller 21 can perform the motor lock control. The first condition is that the battery is unable to be charged, the second condition is that the rollback of the vehicle occurs, and the third condition is that the accelerator pedal is depressed. S40 corresponds to a procedure as functions of a motor lock device recited in claims.

Specifically, at S40, the determinator 13 outputs the motor lock command to the motor controller 21. While the determinator 13 outputs the motor lock command to the motor controller 21, the drive torque calculator 14 keeps the drive torque command outputted to the motor controller 21 at zero. In this way, when the motor lock start condition is satisfied, the electronic control apparatus 100 locks the MG. In the timing diagram shown in FIG. 3, the motor lock control is started at the time t2. It is noted that when the MG is locked, the vehicle speed approaches zero. Therefore, the motor lock control can be translated as control for reducing the vehicle speed to zero by locking the MG.

When receiving the motor lock command, the motor controller 21 controls the inverter of the vehicle to supply an excitation current to the MG, thereby aligning a rotor magnetic field with a rotating magnetic field as shown in FIG. 4, so that the MG is locked (i.e., stopped). In this way, the MG is locked by controlling the inverter so that the rotor magnetic field can be aligned with the rotating magnetic field. When the MG is locked, the rotor becomes unable to rotate. Therefore, locking the MG can be translated as making the rotor unable to rotate. It is noted that the rotating magnetic field is a magnetic filed generated when the excitation current is supplied to a coil of the MG.

That is, while the MG remains locked, the excitation current remains supplied to the MG. Accordingly, the battery is discharged, so that a battery current flows. In the timing diagram shown in FIG. 3, the excitation current and the battery current start to flow at the time t2.

Then, at S50, the determinator 13 determines whether the motor lock control is completed based on the vehicle state information received from the vehicle state detector 12. Specifically, when the vehicle speed is zero, the determinator 13 determines that the motor lock control is completed. That is, the determinator 13 determines whether the motor lock control is completed based on whether the vehicle is stopped. In the timing diagram shown in FIG. 3, the determinator 13 determines that the motor lock control is completed at a time t3. If the determinator 13 determines that the motor lock control is completed corresponding to YES at S50, the control process proceeds to S60.

At S60, the motor lock control is released so that the MG can be unlocked. Then, at S70, a drive torque to start the vehicle begins to be outputted. That is, when the lock of the MG is completed, the electronic control apparatus 100 commands the MG to output the drive torque according to the accelerator opening degree while releasing the lock of the MG. S50, S60, and S70 correspond to procedures as functions of a torque commander recited in claims. In the timing diagram shown in FIG. 3, at the time t3, the motor lock control switches from ON to OFF, and the drive torque according to the accelerator opening degree begins to be outputted. Further, at the time t3, the excitation current according to a motor torque begins to flow.

At this time, the determinator 13 stops outputting the motor lock command to the motor controller 21. The drive torque calculator 14 receives the vehicle state information including the accelerator opening degree from the vehicle state detector 12 through the determinator 13 and calculates the drive torque according to the accelerator opening degree based on the vehicle state information. Further, the drive torque calculator 14 outputs the drive torque command indicative of the calculated drive torque to the motor controller 21. The motor controller 21 outputs the drive torque according to the drive torque command received from the drive torque calculator 14. For example, the motor controller 21 can have a mapping table which defines a relationship between the drive torque command and the excitation current supplied to the MG. In this case, when the motor controller 21 receives the drive torque command from the drive torque calculator 14, the motor controller 21 refers to the mapping table and controls the inverter so that the excitation current associated with the drive torque command in the mapping table can be supplied to the MG. Thus, as shown in FIG. 3, after the time t3, the excitation current according to the accelerator opening degree is supplied to the MG so that the MG can generate the drive torque (i.e., motor torque) according to the accelerator opening degree.

As described above, according to the first embodiment, the electronic control apparatus 100 starts the motor lock control for locking the MG, when the motor lock start condition is satisfied, i.e., when all the following three conditions are satisfied: The battery is unable to be charged, the rollback of the vehicle occurs, and the accelerator pedal is depressed. Thus, the vehicle which rolls back can be temporarily stopped. Then, when the lock of the MG is completed, the electronic control apparatus 100 commands the MG to output the drive torque according to the accelerator opening degree while releasing the lock of the MG.

In such an approach, even when the battery is unable to be charged, and the MG cannot perform regenerative action, the vehicle which rolls back can be temporarily stopped and then can start up. Therefore, there is no need to charge the battery. That is, since the electronic control apparatus 100 does not generate electric power to charge the battery, an additional electrical load such as a compressor is unnecessary. Thus, even when the battery is unable to be charged, the electronic control apparatus 100 can suitably start the vehicle which rolls back without using an additional electrical load.

Since the electronic control apparatus 100 temporarily stops the vehicle which is rolling back and then starts the temporarily-stopped vehicle, the MG does not perform the regenerative action. Thus, as shown in FIG. 3, the electronic control apparatus 100 can start the vehicle during the time period from the time t2 to the time t3 without producing electric power to charge the battery.

In the first embodiment, a determination of whether the rollback of the vehicle occurs is made based on the vehicle speed. Alternatively, the determination of whether the rollback of the vehicle occurs can be made based on a rotation speed of the MG. That is, a determination of whether the vehicle speed is negative or positive can be made based on the rotation speed of the MG.

In the first embodiment, the present disclosure is applied to a case where the vehicle is on an uphill in such a manner that the rear side of the vehicle can be positioned vertically lower than the front side of the vehicle. Alternatively, the present disclosure can be applied to a case where the vehicle is on a downhill in such a manner that the front side of the vehicle can be positioned vertically lower than the rear side of the vehicle.

Second Embodiment

An electronic control apparatus 110 according to a second embodiment is described below with reference to FIGS. 5-7. The electronic control apparatus 110 differs from the electronic control apparatus 100 in that when the motor lock start condition is satisfied, the electronic control apparatus 110 fixes the rotor of the MG to a TARGET LOCK POSITION.

Figure 5:
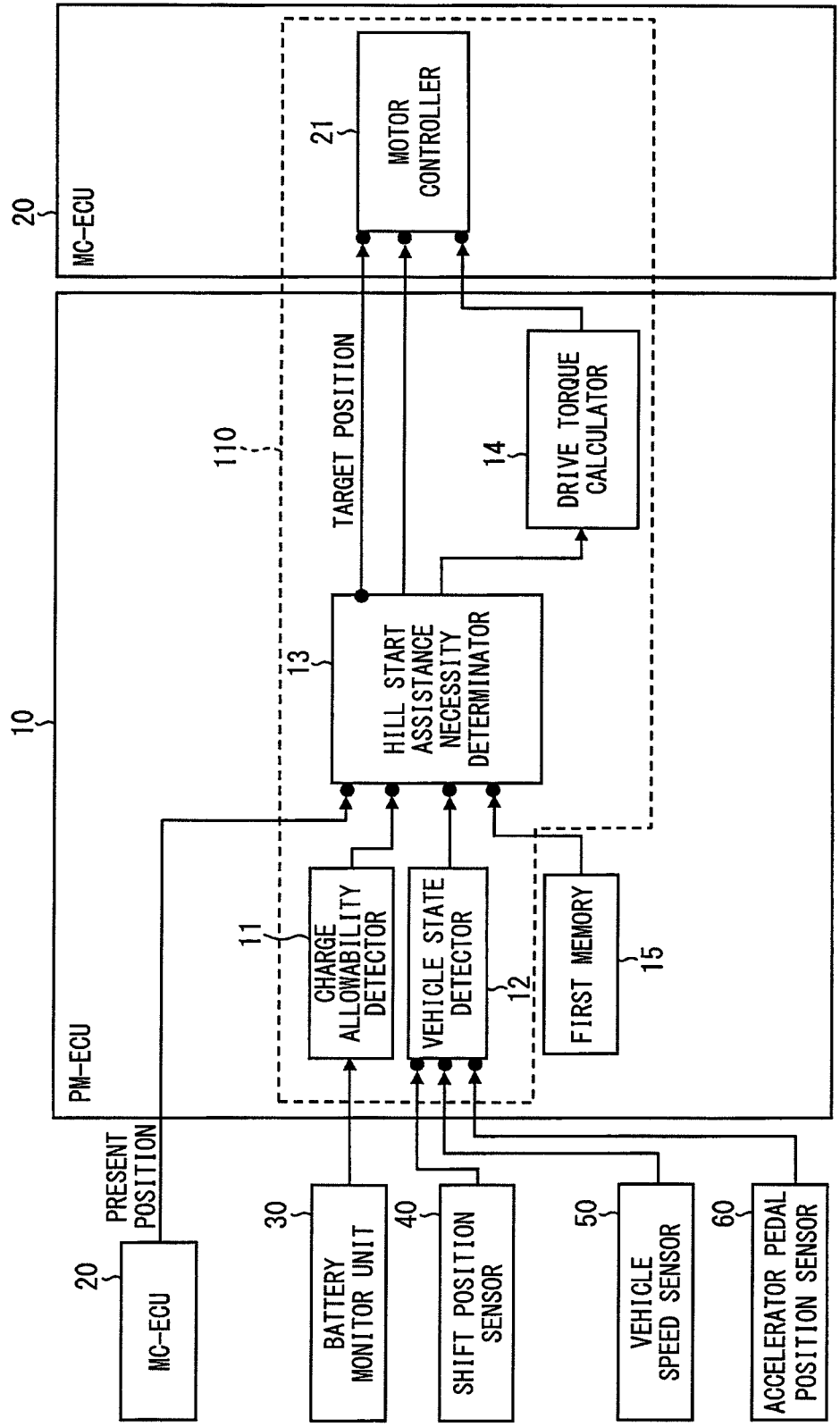
FIG. 5 is a block diagram of an electronic control apparatus according to a second embodiment of the present disclosure.

As shown in FIG. 5, the PM-ECU 10 of the electronic control apparatus 110 has a first memory section 15 for storing lock position information indicative of the target lock position. The target lock position is a predetermined fixed value.

The MC-ECU 20 repeatedly detects a present position of the rotor at a predetermined time interval. That is, although not shown in FIG. 5, the MC-ECU 20 has a rotor position detector for repeatedly detecting the present position of the rotor at the predetermined time interval. Alternatively, the motor controller 21 can have a function of repeatedly detecting the present position of the rotor at the predetermined time interval. The MC-ECU 20 sequentially outputs rotor position information indicative of the detected present rotor position to the determinator 13.

The determinator 13 obtains the lock position information stored in the first memory section 15. Thus, the determinator 13 obtains both the lock position information indicative of the target lock position and the rotor position information indicative of the present rotor position. The determinator 13 outputs the lock position information to the motor controller 21.

The determinator 13 calculates a deviation between the present rotor position and the target lock position based on the obtained information. As described above, the rotor position information indicative of the present rotor position is sequentially inputted to the determinator 13. Therefore, the determinator 13 sequentially calculates the deviation between the present rotor position and the target lock position. Thus, the determinator 13 can detect a change in the deviation between the present rotor position and the target lock position. The determinator 13 outputs the motor lock command including deviation information indicative of the calculated deviation to the motor controller 21.

The motor controller 21 locks the MG based on the present rotor position detected by the MC-ECU 20 and the target rotor position received from the determinator 13 in such a manner that the rotor can be fixed to the target lock position. At this time, the motor controller 21 controls the excitation current supplied to the MG based on the deviation information received from the determinator 13 in such a manner that the excitation current increases with a decrease in the deviation as shown in FIG. 7. Thus, the motor controller 21 gradually increases the excitation current as the deviation becomes smaller. For example, the motor controller 21 can have a mapping table which defines a relationship between the deviation and the excitation current supplied to the MG. In this case, the motor controller 21 determines the excitation current supplied to the MG by using the mapping table based on the deviation information received from the determinator 13.

Figure 6:
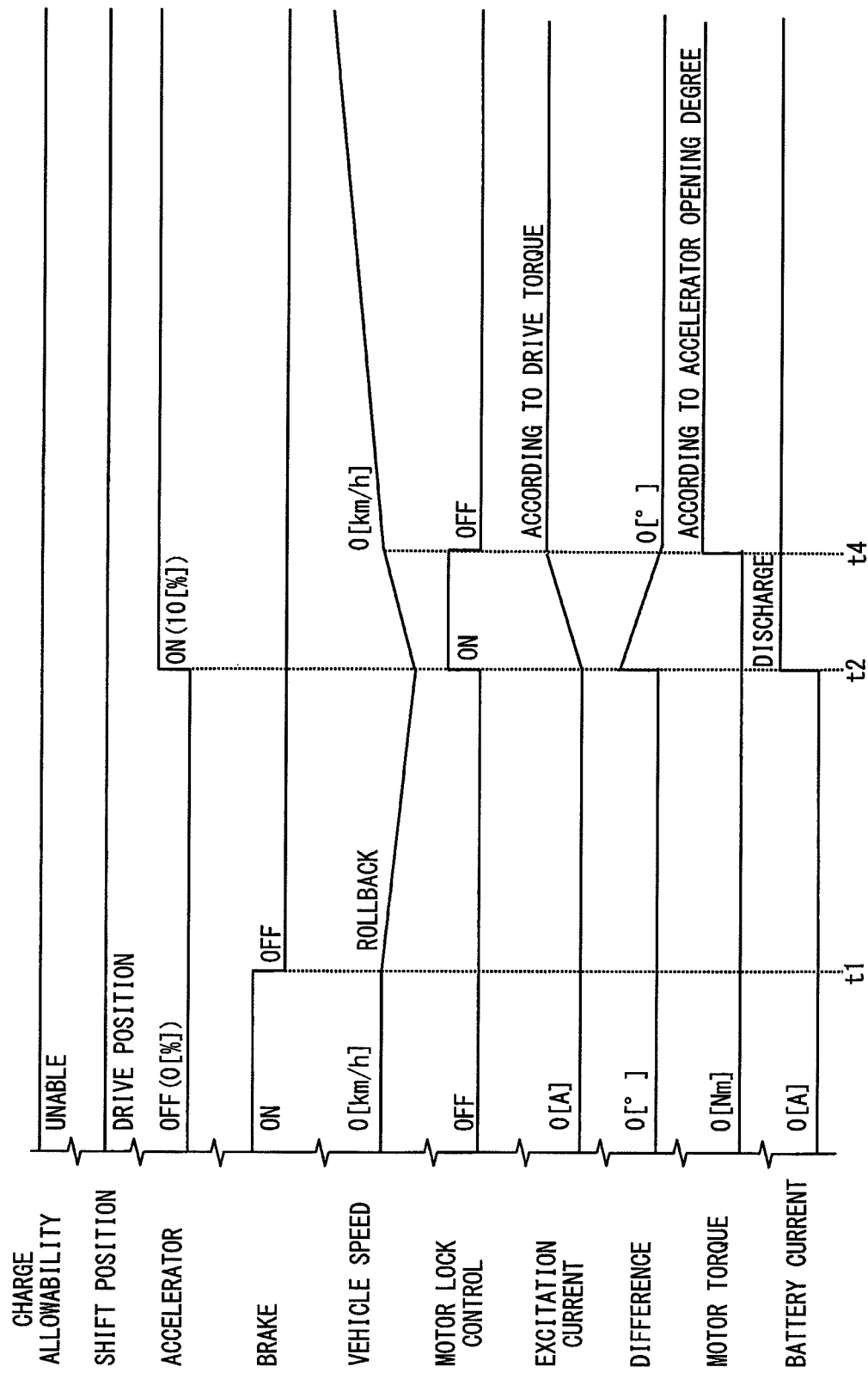
FIG. 6 is a timing diagram of an operation of the electronic control apparatus according to the second embodiment.
Figure 7:
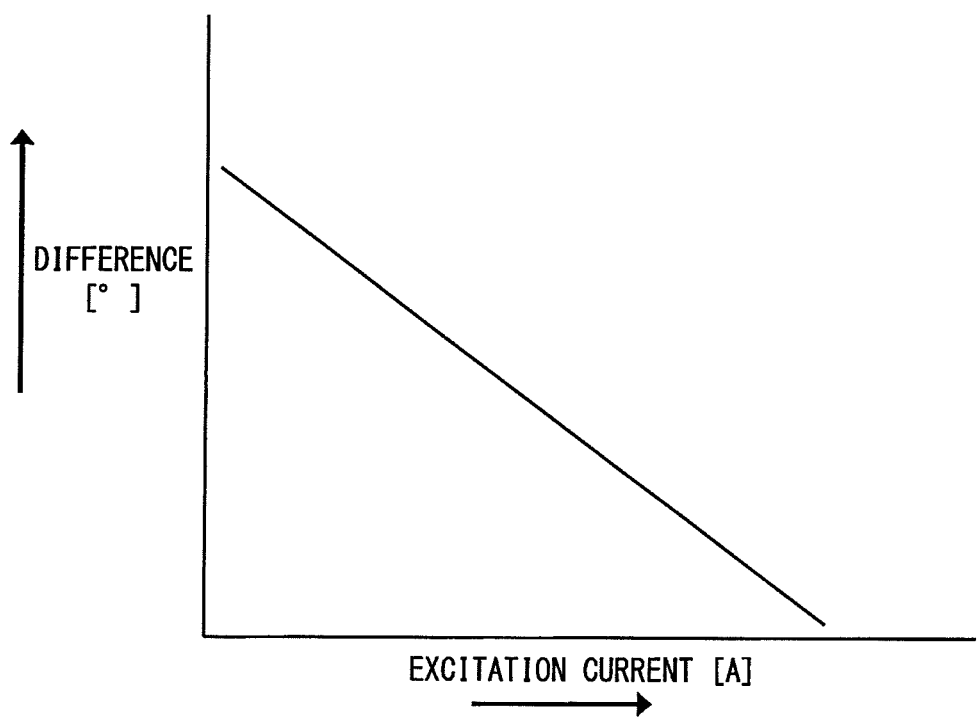
FIG. 7 is a graph illustrating a motor excitation current according to the second embodiment.

Thus, as shown in FIG. 6, the vehicle speed gradually decreases to zero during a time period from a time t2 to a time t4. Since the motor controller 21 controls the excitation current supplied to the MG in such a manner that the excitation current increases with a decrease in the deviation, impact applied to the vehicle when the MG is locked can be reduced. Also, the electronic control apparatus 110 has the same advantages as the electronic control apparatus 100.

Third Embodiment

An electronic control apparatus according to a third embodiment of the present disclosure is described below with reference to FIG. 8. Since the third embodiment is a modification of the second embodiment, the same terms as used in the second embodiment are used in the third embodiment. The third embodiment differs from the second embodiment in that the target lock position can change with the present rotor position.

According the third embodiment, as described in the preceding embodiments, the determinator 13 receives the vehicle state information including the accelerator opening degree from the vehicle state detector 12, the lock position information indicative of the target lock position from the first memory section 15, and the rotor position information indicative of the present rotor position from the MC-ECU 20. The determinator 13 changes the target lock position in such a manner that the target lock position approaches the present rotor position as the accelerator opening degree becomes larger. That is, the first memory section 15 stores an initial value of the target lock position, and the determinator 13 updates the initial value of the target lock position in a manner as described above. Then, the determinator 13 calculates a deviation between the updated target lock position and the present rotor position.

Figure 8:
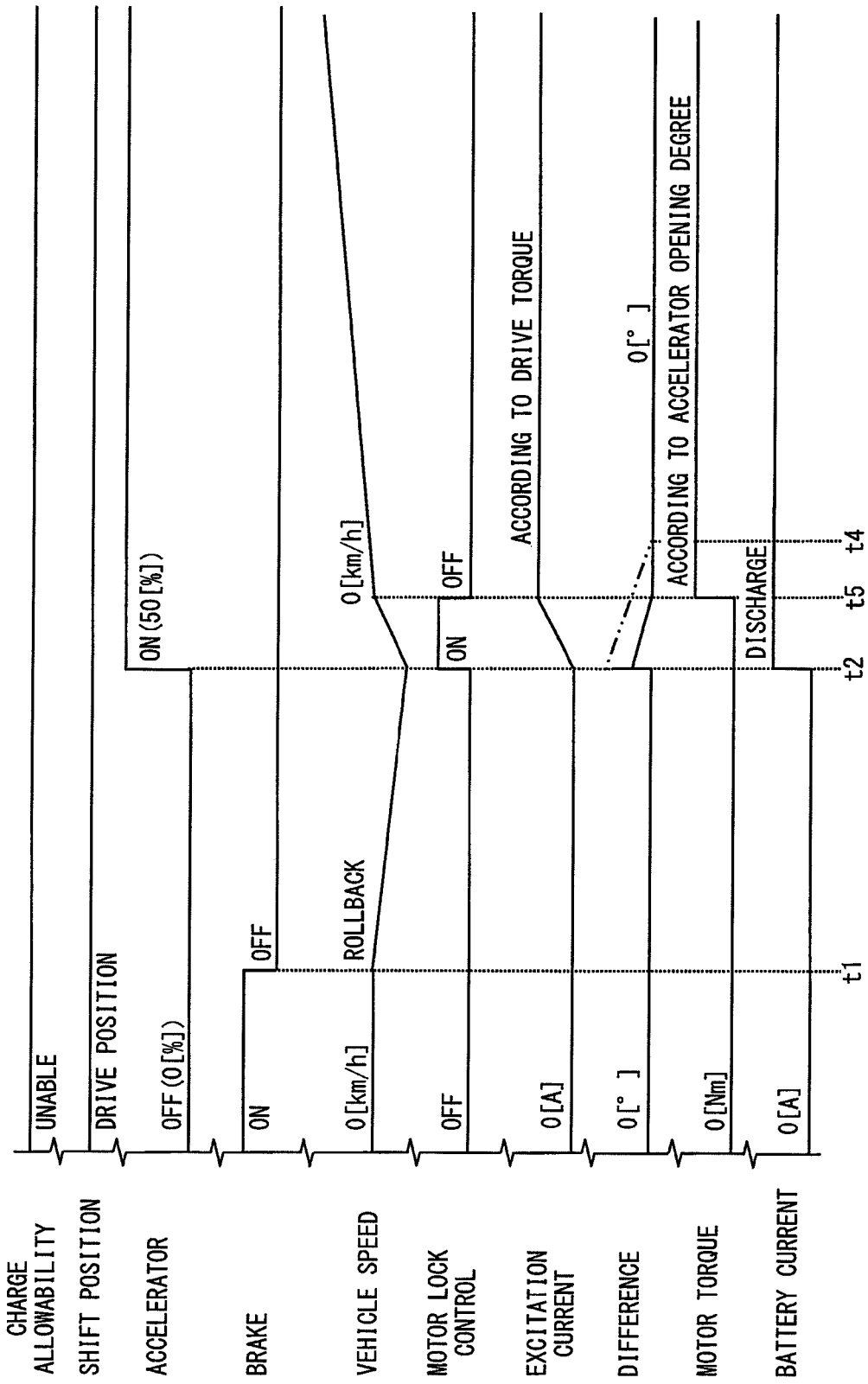
FIG. 8 is a timing diagram of an operation of an electronic control apparatus according to a third embodiment of the present disclosure.
Figure 9:
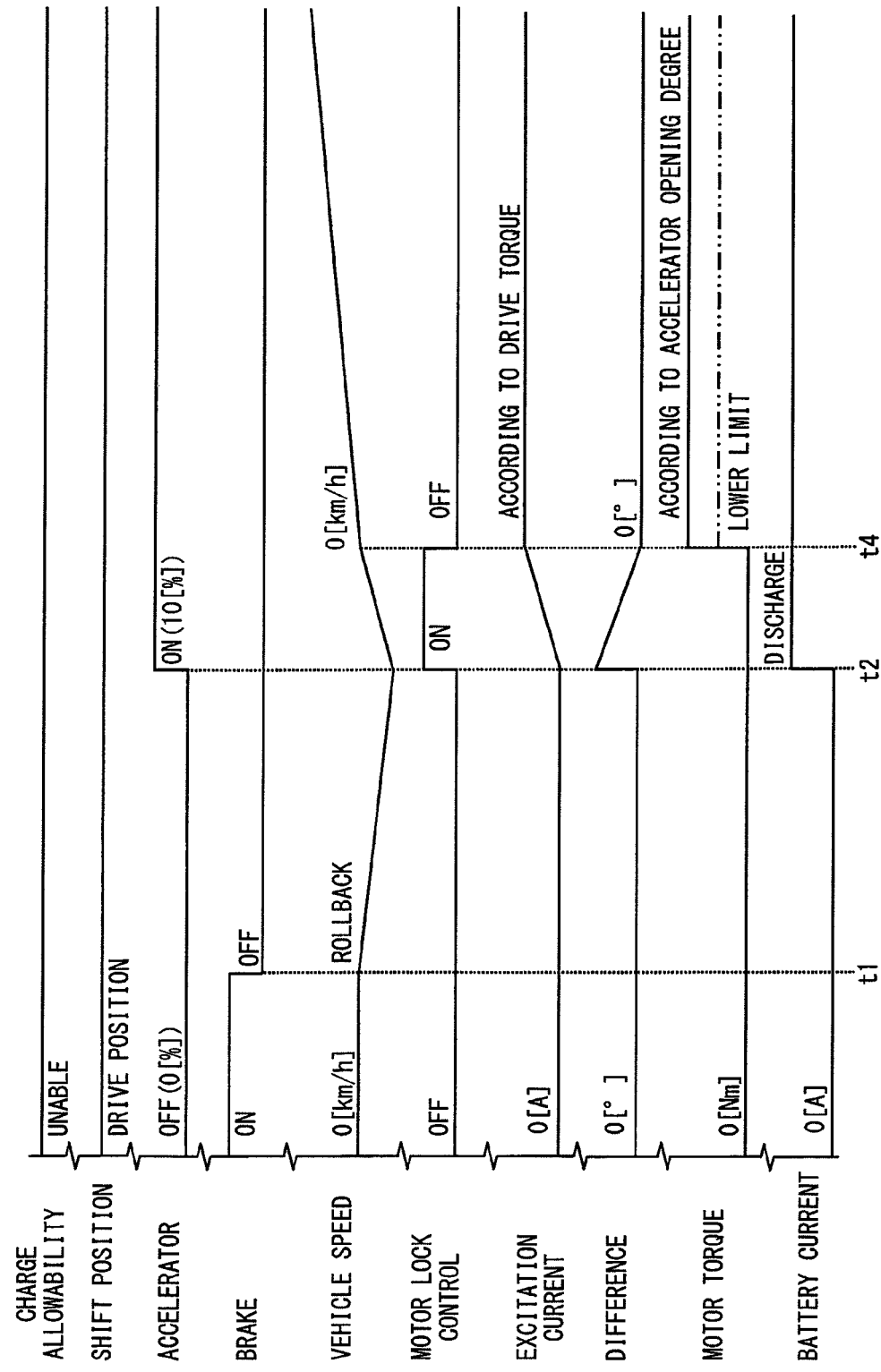
FIG. 9 is a timing diagram of an operation of an electronic control apparatus according to a fourth embodiment of the present disclosure.

In such an approach, as shown in FIG. 8, the deviation becomes smaller when the accelerator opening degree is 50% indicated by a solid line than when the accelerator opening degree is 10% indicated by a dashed-two dotted line. Therefore, the electronic control apparatus according to the third embodiment can lock the MG in a shorter time. Also, the electronic control apparatus according to the third embodiment has the same advantages as the electronic control apparatus 110.

Fourth Embodiment

An electronic control apparatus according to a fourth embodiment of the present disclosure is described below with reference to FIG. 8. Since the fourth embodiment is a modification of the second embodiment, the same terms as used in the second embodiment are used in the fourth embodiment. The fourth embodiment differs from the second embodiment in that the electronic control apparatus generates the drive torque according to the accelerator opening degree in such a manner that the drive torque is kept above a lower limit DTL that prevents the vehicle from rolling back.

In the fourth embodiment, when the lock of the MG is completed, the electronic control apparatus commands the MG to output the drive torque according to the accelerator opening degree in such a manner that the drive torque is kept above the lower limit DTL that prevents the vehicle from rolling back while releasing the lock of the MG. Like in the second embodiment, the drive torque calculator 14 receives the vehicle state information including the accelerator opening degree from the vehicle state detector 12 through the determinator 13 and calculates the drive torque according to the accelerator opening degree based on the vehicle state information. Further, the drive torque calculator 14 outputs the drive torque command indicative of the calculated drive torque to the motor controller 21. If the calculated drive torque is not enough to prevent the vehicle from rolling back, the drive torque calculator 14 outputs the drive torque command corresponding to the lower limit DTL to the motor controller 21 as indicated by a chain double-dashed line. For example, the lower limit DTL can be calculated by a method described later in a seventh embodiment.

In such an approach, even when the amount of depression of the accelerator pedal depressed by the driver is not enough to prevent the vehicle from rolling back, the electronic control apparatus prevents the vehicle from rolling back after temporarily stopping the vehicle. Also, the electronic control apparatus according to the fourth embodiment has the same advantages as the electronic control apparatus 110.

Fifth Embodiment

An electronic control apparatus 120 according to a fifth embodiment of the present disclosure is described below with reference to FIGS. 10 and 11. The electronic control apparatus 120 differs from the electronic control apparatus 100 in that when the motor lock start condition is satisfied, the electronic control apparatus 120 locks the MG by stopping the vehicle while aligning the rotor magnetic field with the rotating magnetic field.

Figure 10:
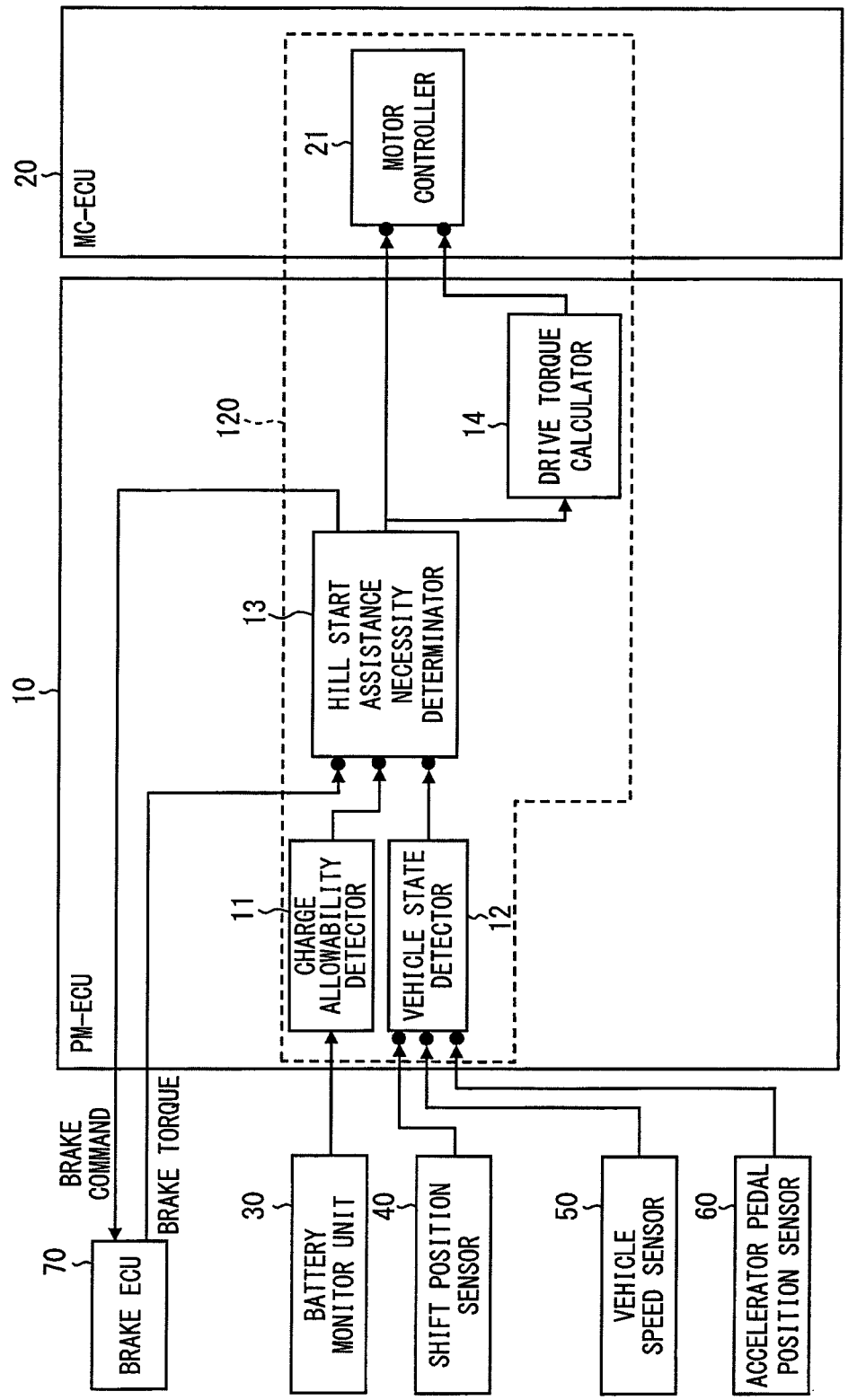
FIG. 10 is a block diagram of an electronic control apparatus according to a fifth embodiment of the present disclosure.
Figure 11:
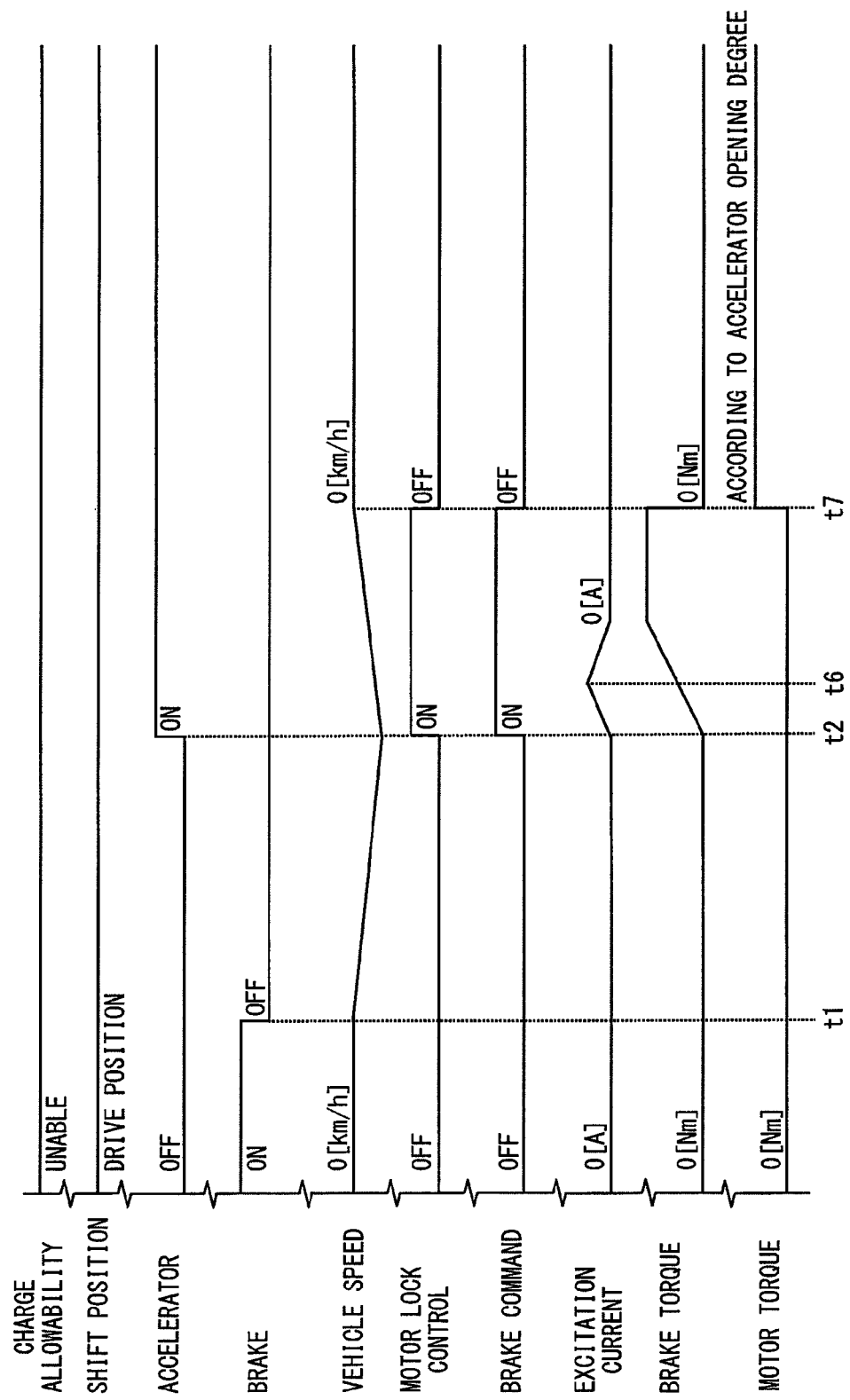
FIG. 11 is a timing diagram of an operation of the electronic control apparatus according to the fifth embodiment.

As shown in FIG. 10, according to the fifth embodiment, the vehicular apparatus includes a brake ECU 70. For example, the brake ECU 70 is configured as a computer in the same manner as the PM-ECU 10. The brake ECU 70 controls a brake of the vehicle according to an operation of a brake pedal by a driver of the vehicle. The brake ECU 70 detects a brake operation state indicative of the amount of depression of the brake pedal (i.e., an opening degree of the brake). The brake ECU 70 calculates a necessary brake force (i.e., brake torque) based on the detected brake operation state and outputs brake information including the calculated brake force. The PM-ECU 10 of the electronic control apparatus 120 receives the brake information indicative of the brake force from the brake ECU 70 and outputs a brake command to the brake ECU 70. The amount of depression of the brake pedal is hereinafter sometimes referred to as the "brake opening degree", and the brake force is hereinafter sometimes referred to as the "brake torque".

When the motor lock start condition is satisfied, the determinator 13 outputs the motor lock command to the motor controller 21 and the brake command to the brake ECU 70. While the determinator 13 outputs the motor lock command to the motor controller 21, the drive torque calculator 14 keeps the drive torque command outputted to the motor controller 21 at zero.

Thus, the motor controller 21 performs the motor lock control based on the motor lock command in the same manner as described in the first embodiment.

Further, the brake ECU 70 performs the motor lock control based on the brake command. While receiving the brake command, the brake ECU 70 activates the brake. That is, the brake command corresponds to the motor lock command.

As described above, when the motor lock start condition is satisfied, the electronic control apparatus 120 locks the MG by controlling the inverter so that the rotor magnetic field can be aligned with the rotating magnetic field and by outputting the brake command to the break ECU 70 to stop the vehicle. In this way, since the electronic control apparatus 120 locks the MG not only by aligning the rotor magnetic field with the rotating magnetic field but also by using the brake, the vehicle can be surely stopped. Also, the electronic control apparatus 120 has the same advantages as the electronic control apparatus 100.

For example, in the electronic control apparatus 120, the excitation current supplied to the MG to lock the MG can be controlled according to the brake torque. Specifically, the determinator 13 receives the brake information indicative of the brake torque from the brake ECU 70 and outputs the brake information to the motor controller 21. When the motor controller 21 locks the MG, the motor controller 21 determines whether the brake torque reaches a predetermined torque value. If the motor controller 21 determines that the brake torque reaches the torque value, the motor controller 21 reduces the excitation current supplied to the MG. In a timing diagram shown in FIG. 11, the motor controller 21 starts to perform the motor lock control at a time t2 and then starts to reduce the excitation current at a time t6. In such an approach, the excitation current supplied to the MG to lock the MG can be reduced under a condition where the vehicle can be adequately stopped by using the brake.

As describe above, according to the fifth embodiment, the electronic control apparatus 120 locks the MG by controlling both the inverter and the brake. It is noted that when the brake is activated to stop the vehicle, the rotation of the rotor of the MG is stopped accordingly. Therefore, it is not always necessary to control the inverter to lock the MG. That is, the MG can be locked by controlling the brake so that the vehicle can be stopped without controlling the inverter. In this case, the determinator 13 locks the MG by outputting the brake command to the brake ECU 70 to stop the vehicle.

Sixth Embodiment

An electronic control apparatus 130 according to a sixth embodiment of the present disclosure is described below with reference to FIG. 12. The electronic control apparatus 130 differs from the electronic control apparatus 120 in that when at least one of a temperature of the inverter and a temperature of the MG is not less than a predetermined temperature value, the electronic control apparatus 130 outputs the brake command to the brake ECU 70 to stop the vehicle.

Figure 12:
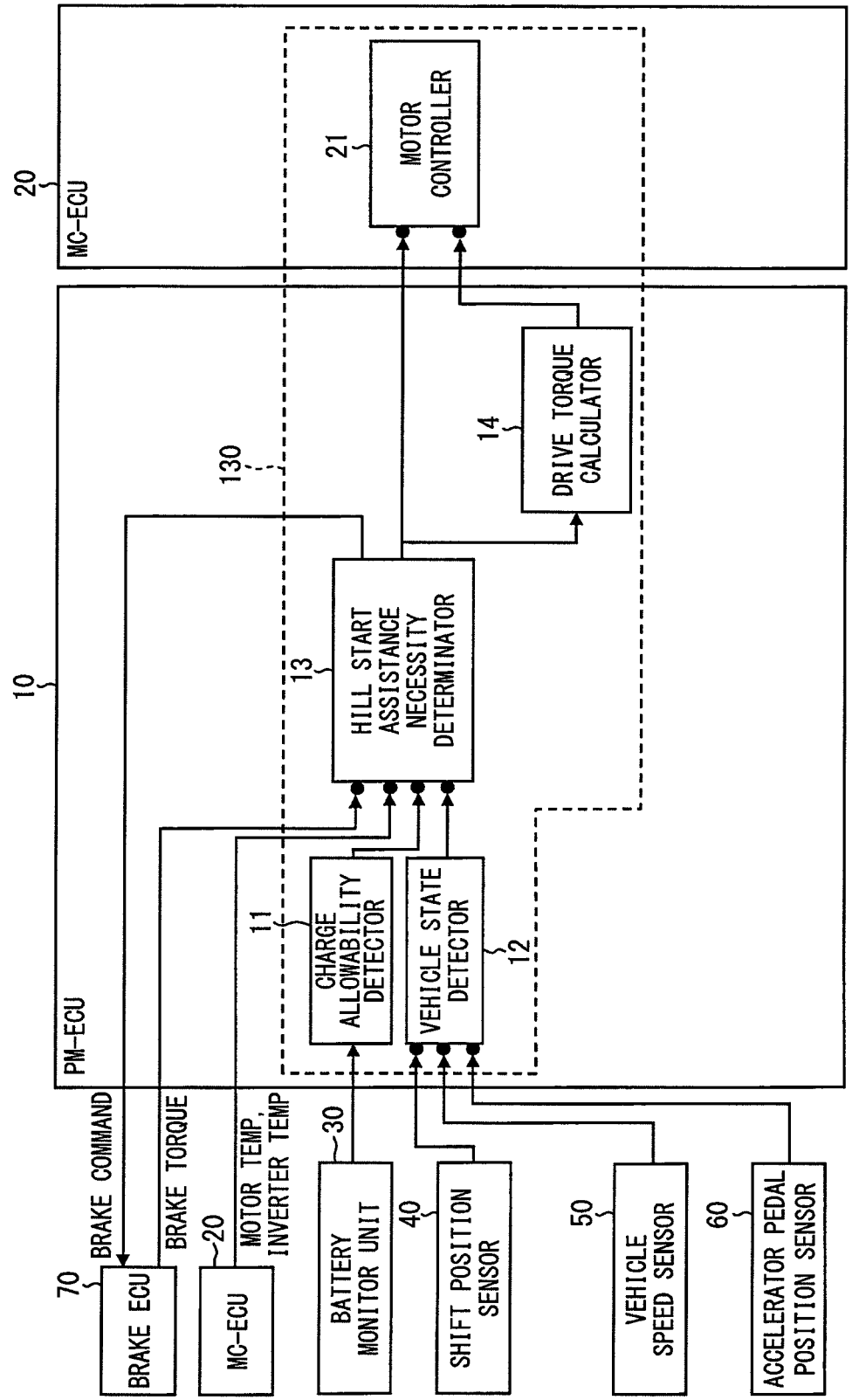
FIG. 12 is a block diagram of an electronic control apparatus according to a sixth embodiment of the present disclosure.

As shown in FIG. 12, the MC-ECU 20 detects the temperature of the MG and outputs motor temperature information indicative of the detected temperature of the MG to the determinator 13. Further, the MC-ECU 20 detects the temperature of the inverter and outputs inverter temperature information indicative of the detected temperature of the inverter to the determinator 13.

Thus, the determinator 13 obtains both the motor temperature information and the inverter temperature information. When the motor controller 21 locks the MG, the determinator 13 determines whether at least one of the temperature of the inverter and the temperature of the MG is not less than the temperature value. If the determinator 13 determines that both the temperature of the inverter and the temperature of the MG are less than the temperature value, the determinator 13 locks the MG by outputting the brake command to the break ECU 70 to stop the vehicle while controlling the inverter to align the rotor magnetic field of the MG with the rotating magnetic field like in the fifth embodiment. In contrast, if the determinator 13 determines that at least one of the temperature of the inverter and the temperature of the MG is not less than the temperature value, the determinator 13 locks the MG only by outputting the brake command to the break ECU 70.

In such an approach, failures of the inverter and the MG can be reduced. Also, the electronic control apparatus 130 has the same advantages as the electronic control apparatus 120.

Seventh Embodiment

An electronic control apparatus 140 according to a seventh embodiment of the present disclosure is described below with reference to FIG. 13. The seventh embodiment is a modification of the fourth embodiment. In the seventh embodiment, the lower limit DTL of the drive torque that prevents the vehicle from rolling back is calculated, and the drive torque is generated according to the accelerator opening degree in such a manner that the drive torque is kept above the lower limit DTL.

Figure 13:
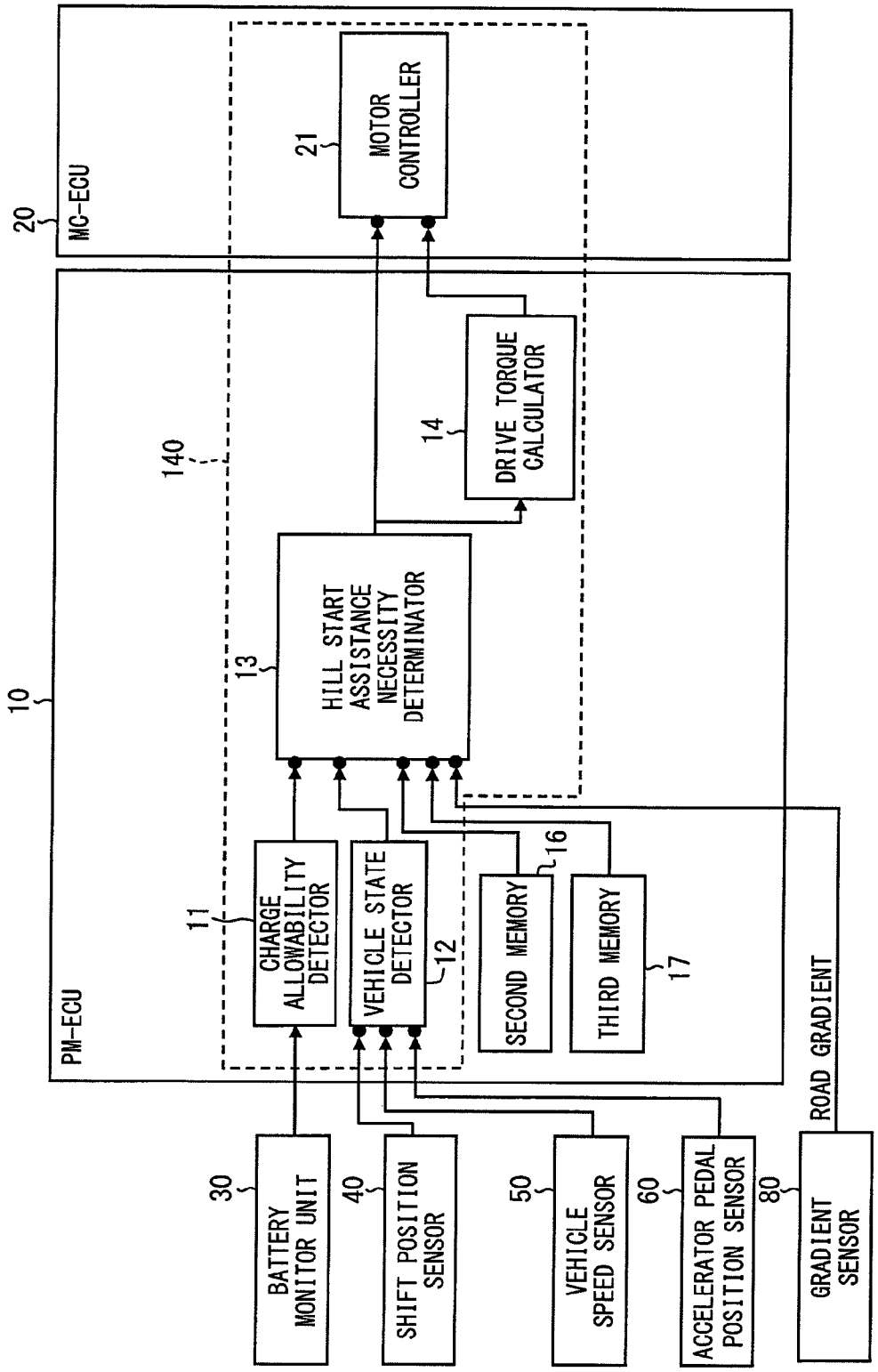
FIG. 13 is a block diagram of an electronic control apparatus according to a seventh embodiment of the present disclosure.

As shown in FIG. 13, the electronic control apparatus 140 is applied to a vehicular apparatus including a gradient sensor 80. The gradient sensor 80 detects a road gradient θ of a road on which the vehicle is located and outputs gradient information indicative of the detected road gradient θ. The PM-ECU 10 has a second memory section 16 for storing mass information indicative of a mass M of the vehicle and tire information indicative of a radius R of a tire of the vehicle. The PM-ECU 10 further has a third memory section 17 for storing gravity information indicative of a gravitational acceleration G. In an example shown in FIG. 13, the second and third memory sections 16 and 17 are located outside the electronic control apparatus 140. Alternatively, at least one of the second and third memory sections 16 and 17 can be included in the electronic control apparatus 140.

The determinator 13 obtains the mass information and the tire information from the second memory section 16. Further, the determinator 13 obtains the gravity information indicative of the gravitational acceleration G. Furthermore, the determinator 13 obtains the gradient information indicative of the road gradient θ. The determinator 13 outputs all of this information to the drive torque calculator 14.

Thus, the drive torque calculator 14 obtains the mass information, the tire information, the gravity information, and the gradient information from the determinator 13. The drive torque calculator 14 calculates the lower limit DTL from the following formula: DTL=M×G×sign θ×R. Therefore, the electronic control apparatus 140 has the same advantages as the electronic control apparatus according to the fourth embodiment.

Modifications

The embodiments can be modified in various ways. For example, in the sixth embodiment, the temperature value as a threshold can be different between the inverter and the MG.

What is claimed is:

1. An electronic control apparatus mountable on a vehicle, the vehicle including a motor generator connected to a drive wheel of the vehicle to drive the drive wheel and a battery configured to supply electric power to the motor generator, the battery capable of being charged by regenerative action of the motor generator, the electronic control apparatus configured to:
   determine that the battery is unable to be charged;
   determine that a rollback of the vehicle occurs;
   determine that an accelerator pedal of the vehicle is depressed based on an amount of depression of the accelerator pedal;
   lock the motor generator when the battery is unable to be charged, the rollback of the vehicle occurs, and the accelerator pedal is depressed; and
   when the lock of the motor generator is completed, command the motor generator to generate a drive torque according to the amount of depression of the accelerator pedal while releasing the lock of the motor generator,
   lock the motor generator by controlling an inverter of the vehicle to supply an excitation current to the motor generator in such a manner that a rotor magnetic field and a rotating magnetic field of the motor generator are aligned with each other,
   lock the motor generator in such a manner that a rotor of the motor generator is fixed to a predetermined target position,
   obtain the target position and a present position of the rotor and calculate a difference between the target position and the present position, and
   increase the supply of the excitation current to the motor generator as the difference decreases.

2. The electronic control apparatus according to claim 1, further configured to
   update the target position so that the target position becomes closer to the present position as the amount of depression of the accelerator pedal increases, and
   calculate the difference based on the updated target position.

3. The electronic control apparatus according to claim 1, further configured to,
   when the lock of the motor generator is completed, command the motor generator to generate the drive torque according to the amount of depression of the accelerator pedal in such a manner that the drive torque is kept above a lower limit that prevents a rollback of the vehicle.

4. An electronic control apparatus mountable on a vehicle, the vehicle including a motor generator connected to a drive wheel of the vehicle to drive the drive wheel and a battery configured to supply electric power to the motor generator, the battery capable of being charged by regenerative action of the motor generator, the electronic control apparatus configured to:
   determine that the battery is unable to be charged;
   determine that a rollback of the vehicle occurs;
   determine that an accelerator pedal of the vehicle is depressed based on an amount of depression of the accelerator pedal;
   lock the motor generator when the battery is unable to be charged, the rollback of the vehicle occurs, and the accelerator pedal is depressed; and
   when the lock of the motor generator is completed, command the motor generator to generate a drive torque according to the amount of depression of the accelerator pedal while releasing the lock of the motor generator,
   lock the motor generator by controlling an inverter of the vehicle to supply an excitation current to the motor generator in such a manner that a rotor magnetic field and a rotating magnetic field of the motor generator are aligned with each other, lock the motor generator by commanding a brake controller of the vehicle to produce a brake force to stop the vehicle in addition to by controlling the inverter, and reduce the supply of the excitation current to the motor generator by controlling the inverter when the brake force reaches a predetermined force value.

5. The electronic control apparatus according to claim 4, further configured to, when the lock of the motor generator is completed, command the motor generator to generate the drive torque according to the amount of depression of the accelerator pedal in such a manner that the drive torque is kept above a lower limit that prevents a rollback of the vehicle.

6. An electronic control apparatus mountable on a vehicle, the vehicle including a motor generator connected to a drive wheel of the vehicle to drive the drive wheel and a battery configured to supply electric power to the motor generator, the battery capable of being charged by regenerative action of the motor generator, the electronic control apparatus configured to:

determine that the battery is unable to be charged;

determine that a rollback of the vehicle occurs;

determine that an accelerator pedal of the vehicle is depressed based on an amount of depression of the accelerator pedal;

lock the motor generator when the battery is unable to be charged, the rollback of the vehicle occurs, and the accelerator pedal is depressed; and when the lock of the motor generator is completed, command the motor generator to generate a drive torque according to the amount of depression of the accelerator pedal while releasing the lock of the motor generator, lock the motor generator by controlling an inverter of the vehicle to supply an excitation current to the motor generator in such a manner that a rotor magnetic field and a rotating magnetic field of the motor generator are aligned with each other, lock the motor generator by commanding a brake controller of the vehicle to produce a brake force to stop the vehicle in addition to by controlling the inverter, and lock the motor generator by commanding the brake controller instead of by controlling the inverter when at least one of a temperature of the inverter and a temperature of the motor generator is not less than a predetermined temperature value.

7. The electronic control apparatus according to claim 6, further configured to, when the lock of the motor generator is completed, command the motor generator to generate the drive torque according to the amount of depression of the accelerator pedal in such a manner that the drive torque is kept above a lower limit that prevents a rollback of the vehicle.

8. An electronic control apparatus mountable on a vehicle, the vehicle including a motor generator connected to a drive wheel of the vehicle to drive the drive wheel and a battery configured to supply electric power to the motor generator, the battery capable of being charged by regenerative action of the motor generator, the electronic control apparatus configured to:

determine that the battery is unable to be charged;

determine that a rollback of the vehicle occurs;

determine that an accelerator pedal of the vehicle is depressed based on an amount of depression of the accelerator pedal;

lock the motor generator when the battery is unable to be charged, the rollback of the vehicle occurs, and the accelerator pedal is depressed; and when the lock of the motor generator is completed, command the motor generator to generate a drive torque according to the amount of depression of the accelerator pedal while releasing the lock of the motor generator, when the lock of the motor generator is completed, command the motor generator to generate the drive torque according to the amount of depression of the accelerator pedal in such a manner that the drive torque is kept above a lower limit that prevents a rollback of the vehicle, obtain a mass of the vehicle, a radius of a tire of the vehicle, a gradient of an area where the vehicle is located, and a gravitational acceleration of the area, and calculate the lower limit of the drive torque based on a formula $DTL = M \times G \times \text{sign}\,\theta \times R$, where DTL represents the lower limit, M represents the mass of the vehicle, G represents the gravitational acceleration of the area, $\theta$ represents the gradient, and R represents the radius.

9. The electronic control apparatus according to claim 8, further configured to lock the motor generator by controlling an inverter of the vehicle to supply an excitation current to the motor generator in such a manner that a rotor magnetic field and a rotating magnetic field of the motor generator are aligned with each other.

10. The electronic control apparatus according to claim 9, further configured to lock the motor generator by commanding a brake controller of the vehicle to produce a brake force to stop the vehicle in addition to by controlling the inverter.

11. The electronic control apparatus according to claim 8, further configured to lock the motor generator by commanding a brake controller of the vehicle to produce a brake force to stop the vehicle.

* * * * *